United States Patent [19]

Owen et al.

[11] Patent Number: 4,957,617

[45] Date of Patent: Sep. 18, 1990

[54] FLUID CATALYTIC CRACKING

[75] Inventors: Hartley Owen, Belle Mead, N.J.; Paul H. Schipper, Wilmington, Del.

[73] Assignee: Mobil Oil Corporation, New York, N.Y.

[21] Appl. No.: 293,723

[22] Filed: Jan. 5, 1989

Related U.S. Application Data

[60] Continuation-in-part of Ser. No. 202,843, Jun. 6, 1988, and a continuation-in-part of Ser. No. 271,803, Nov. 15, 1988, said Ser. No. 202,843, is a division of Ser. No. 903,314, Sep. 3, 1986, Pat. No. 4,749,470, said Ser. No. 271,803, is a division of Ser. No. 903,367, Sep. 3, 1986, Pat. No. 4,787,967.

[51] Int. Cl.$^5$ .............................................. C10G 11/05
[52] U.S. Cl. .................................... 208/113; 208/120
[58] Field of Search ............................... 208/120, 113

[56] References Cited

U.S. PATENT DOCUMENTS

| | | | |
|---|---|---|---|
| 3,074,878 | 1/1963 | Pappas | 208/127 |
| 3,412,013 | 11/1968 | Bowles | 208/120 |
| 3,894,935 | 7/1975 | Owen | 208/74 |
| 4,414,101 | 11/1983 | Smith et al. | 208/113 |
| 4,541,923 | 9/1985 | Lomas et al. | 208/164 |
| 4,555,328 | 11/1985 | Krambeck et al. | 208/113 |
| 4,624,771 | 11/1986 | Lane et al. | 208/74 |
| 4,693,808 | 9/1987 | Dewitz | 208/113 |
| 4,717,466 | 1/1988 | Herbst et al. | 208/113 |
| 4,749,470 | 6/1988 | Herbst et al. | 208/85 |
| 4,752,375 | 6/1988 | Herbst et al. | 208/74 |
| 4,787,967 | 11/1988 | Herbst et al. | 208/74 |
| 4,795,547 | 1/1989 | Barnes | 208/120 |
| 4,802,971 | 2/1989 | Herbst et al. | 208/13 |

FOREIGN PATENT DOCUMENTS 0171460  2/1986  European Pat. Off. ............ 208/120

*Primary Examiner*—Anthony McFarlane
*Attorney, Agent, or Firm*—Alexander J. McKillop; Charles J. Speciale; Marina V. Schneller

[57] ABSTRACT

The invention is a fluid catalytic cracking process in which reduced catalyst to petroleum feed contact times at high catalytic cracking temperatures are afforded. The catalytic cracking conditions provide olefinic gasoline product with reduced coke make.

22 Claims, 1 Drawing Sheet

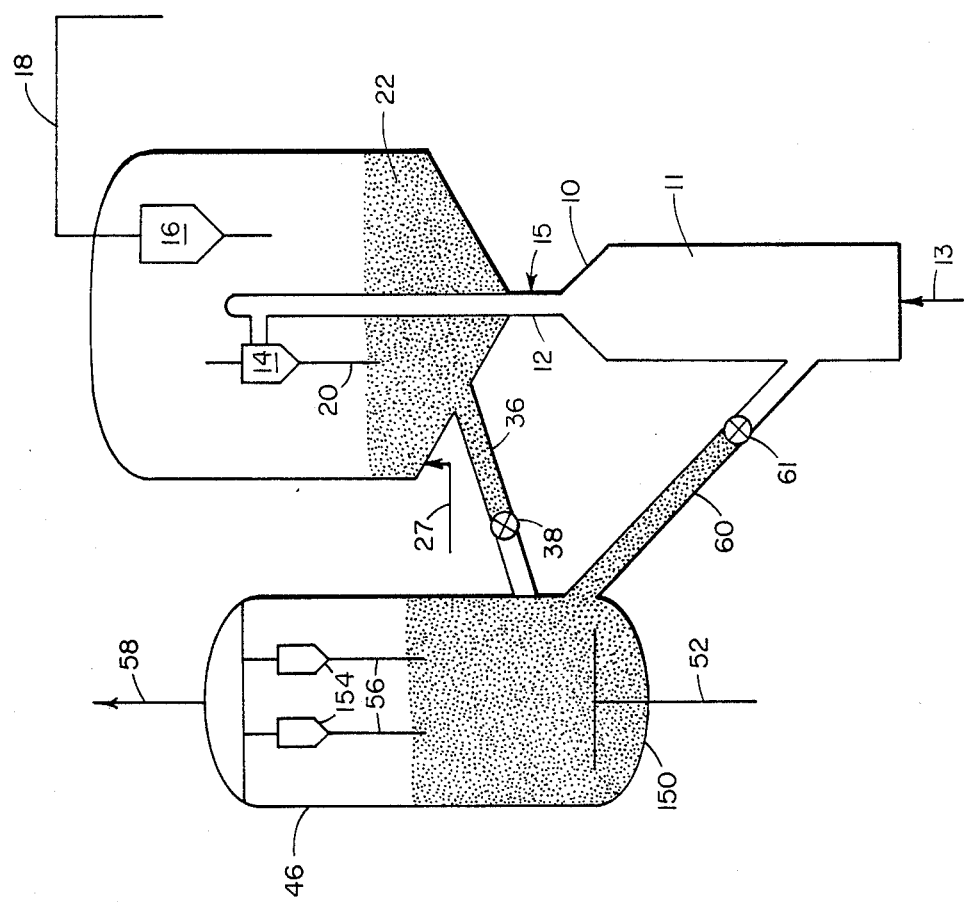

FLUID CATALYTIC CRACKING

CROSS REFERENCE TO RELATED APPLICATIONS

This is a continuation in part of Ser. No. 202,843 filed June 6, 1988 and of Ser. No. 271,803, filed Nov. 15, 1988. Said Ser. No. 202,843,, filed 6-6-88, is in turn a divisional of Ser. No. 903,314 filed Sept. 3, 1986 (now U.S. Pat. No. 4,749,470) and Ser. No. 271,803, filed 11-115-88, is in turn a divisional of Ser. No. 903,367, filed Sept. 3, 1986 (now U.S. Pat. No. 4,787,967). Each of said four applications are relied upon and incorporated by reference herein.

FIELD OF THE INVENTION

The invention relates to a catalytic cracking process for producing olefinic gasoline, with less coke make. The process affords high catalytic cracking temperatures, up to 1100 or 1200° F. Higher temperatures in the cracking zone result in less coke selectivity at reduced cracking-catalyst-feed contact times. Decreasing coke selectivity results in less saturation of olefin products of catalytic cracking. Increased lower olefin make is desireable for other refinery related processes, such as alkylation processes.

BACKGROUND OF THE INVENTION

Catalytic cracking produces about half of the gasoline which is sold in the United States. Although catalytic cracking was originally introduced as a cyclic fixed-bed process, fluid catalytic cracking is now the significant mode of operation. In the fluidized process, small particles of catalyst are suspended in upflowing gas to be handled like a liquid and circulated between reaction and regeneration vessels. The purpose of catalytic cracking is to convert heavy vacuum gas oil or resid to compounds of lower molecular weight boiling in the gasoline and middle distillate range. The primary object is to increase gasoline yields and to raise octane numbers. Gas oil from catalytic cracking is olefinic.

Broad process parameters include temperatures ranging from about 480 and 510° C. in the reactor to about 620° C. in the regenerator when synthetic silica-gel catalysts activated with 15-60% $Al_2O_3$ is employed. Operating pressures are 150-200 kpa (22-29 psi). Zeolite catalysts withstand higher temperatures and are accordingly regenerated above 700° C. to gain the yield benefit owing to lower carbon make (less than 0.1%). Increasing residual carbon content on regenerated catalyst has the effect of decreasing gasoline make, and decreasing $C_5^-$ fractions, while increasing heating oil production.

The amount of coke burned in the regenerator can range from 3 to 6 wt. % based on the fresh feed. That burning results in a release of a large amount of heat. Excess heat is transferred to the reactor by means of circulating catalyst. The circulating catalyst leaving the reactor is stripped with a stripping medium, often steam, to recover hydrocarbons before regeneration occurs. Of the fresh feed, 70 to 80% is cracked to lower boiling materials. With the newer more active zeolite type catalyst, conversion results in increased cracking, up to 80 to 90%.

SUMMARY OF THE INVENTION

It is an object of the process to produce olefinic gasoline.

It is an object of the invention to provide a fluid catalytic cracking process in which catalytic cracking temperatures of 1100° or even 1200° F. are employed.

It is a further object of the invention to provide a catalytic cracking process, undertaken at those temperatures, with catalyst feed contact time of less than one second, to result in less coke make and less saturation of olefin byproducts.

It is a further object of the invention to provide a process with increased olefin yields.

The process of the invention comprises producing olefinic gasoline by contacting heavy hydrocarbon feed in a vertical riser of a fluid catalytic cracking unit with a cracking catalyst, under catalytic cracking conditions, and effecting a feed velocity through the riser to control feed-catalyst contact time to less than one second, wherein the cracking conditions include high temperature cracking conditions.

BRIEF DESCRIPTION OF THE DRAWINGS

FIG. 1 schematically illustrates a single riser fluidized catalytic cracking process in accordance with the invention.

DETAILED DESCRIPTION OF THE INVENTION

The Feeds

Suitable charge stocks for cracking comprise heavy hydrocarbons generally, and in particular, petroleum fractions having an initial boiling point range of at least 400° F., a 50% point range of at least 500° F. and an end point range of at least 600° F. Such hydrocarbon fractions include gas oils, thermal oils, residual oils, (resids), cycle stocks, whole top crudes, tar sand oils, shale oils, synthetic fuels, heavy hydrocarbon fractions derived from the destructive hydrogenation of coal, tar, pitches, asphalts, hydrotreated feedstocks and the like.

The Catalyst

The catalyst can be amorphous, porous silica/alumina or more preferably, microporous crystalline material(s) exhibiting the X-ray diffraction pattern of a large pore zeolite. Representative large pore crystalline silicates used in accordance with the invention include zeolite X, zeolite Y, dealuminated Y, e.g., USY, dealuminated and silicon enriched zeolites, e.g., LZ-210, as well as zeolite ZK-5, zeolite ZK-4, zeolite omega, zeolite beta, ZSM-20, and naturally occurring zeolites such as faujasite, mordenite and the like.

The catalyst can be posited with a shape selective medium pore size crystalline silicate or aluminosilicate (zeolite) catalyst. Representative of medium pore zeolites include ZSM-5, ZSM-11, ZSM-12, ZSM-23, ZSM-48, ZSM-57 and similar materials. These medium pore zeolites are described in the patent literature with respect to their X-ray diffraction patterns which identify the zeolite. The following references describing the respective zeolites are incorporated herein by reference, and particularly, the X-ray diffraction patterns of the respective zeolites described in those references are incorporated by reference herein.

U.S. Pat. No. 3,702,886 describes and claims ZSM-5 and is incorporated herein by reference as is U.S. Pat.

No. 3,709,979 describing ZSM-11; U.S. Pat. No. 3,832,449 describing ZSM-12; U.S. Pat. No. 4,076,842 describing ZSM-23; U.S. Pat. No. 4,016,245 describing ZSM-35.

Representative microporous crystalline silicate cracking catalyst include zeolite X (U.S. Pat. No. 2,882,244); zeolite Y (U.S. Pat. No. 3,130,007); zeolite ZK-5 (U.S. Pat. No. 3,247,195); zeolite ZSM-4 (U.S. Pat. No. 3,314,752).

The zeolites are usually employed in their acid protonated form. Providing the zeolite in the protonated form can be accomplished by employing the procedures to converting the zeolite to an intermediate ammonium form as a result of a ammonium ion exchange followed by calcination to provide the hydrogen form. The operational requirements of these procedures are well known in the art.

Ion exchange of the crystalline silicate materials can be conducted to effect ammonium exchange of said materials. The source of the ammonium ion is not critical; thus the source can be ammonium hydroxide or an ammonium salt such as ammonium nitrate, ammonium sulfate, ammonium chloride and mixtures thereof. These reagents are usually in aqueous solutions; by way of illustration, aqueous solutions of 1N $NH_4OH$, 1N $NH_4NO_3$, 1N $NH_4Cl$ and 1N $NH_4Cl/NH_4OH$ have bee used to effect ammonium ion exchange. The pH of the ion exchange is not critical but is generally maintained at 7 to 12. Ammonium exchange may be conducted for a period of time ranging from about 0.5 to about 20 hours at a temperature ranging from ambient up to about 212° F. The ion exchange may be conducted in a single stage or in multiple stages. Calcination of the ammonium exchanged zeolite will produce the crystalline silicate or zeolite in its acid form. Calcination can be effected at temperatures matrix to about 1200° F.

In the case of catalytic cracking catalysts, it is desired to incorporate the large pore crystalline silicate with selected matrix materials resistant ,to the temperatures and other conditions employed in catalytic cracking processes. Such matrix materials may include active and inactive materials and synthetic or naturally occurring zeolites as well as inorganic materials such as clays, silica and/or metal oxides e.g., alumina. The latter may be either naturally occurring or in the form of gelatinous precipitates, sols or gels including mixtures of silica and metal oxides. Use of a material in conjunction with the zeolite, i.e. combined therewith. which is active, can enhance the conversion and/or selectivity of the catalyst in certain organic conversion processes. Inactive materials suitably serve as diluents to control the amount of conversion in a given process so that products can be obtained economically and orderly without employing other means for controlling the rate or reaction. Frequently, crystalline silicate materials have been incorporated into naturally occurring clays, e.g., bentonite and kaolin. These materials, i.e. clays, oxides, etc., function, in part, as binders for the catalyst. It is desirable to provide a catalyst having good physical strength, because in catalytic cracking processes, the catalyst is often subjected to conditions, which tend to break the catalyst down into smaller particles which cause problems in processing.

Naturally occurring clays which can be composited with the hereby synthesized zeolite include the montmorillonite and kaolin families which include the sub bentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolite catalyst can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silca-alumina-magnesia and silica-magnesia-zirconia. The maxtrix can be in the form of a cogel. A mixture of these components could also be used.

The relative proportions of finely divided crystalline silicate and inorganic oxide gel matrix vary widely with the crystalline silicate content ranging from about 0.1 to about 90 percent by weight, and more usually in the range of about 10 to about 70 percent by weight of the composite.

Embraced by the invention is the use of a two component catalyst including the amorphous and/or large pore zeolite in combination with the medium pore zeolite which are prepared to impart thereto one or more different physical characteristics to the particles of each component such that the second catalyst component will, on the average, have a higher settling rate than the first catalyst component. Residency time of catalyst particles in a riser is primarily dependent on two factors: the linear velocity of the fluid stream within the riser which tends to carry the entire catalyst bed/conversion product/unconverted feed up and out of the riser into the separator unit and the opposing force of gravity which tends to keep the slower moving catalyst particles within the riser. Ordinarily in a mixed catalyst system, both catalyst components will circulate through the system at about the same rate which can be disadvantageous to the efficiency of the system since the medium pore zeolites (or other catalyst component which does not require as frequent regeneration as the cracking catalyst will be needlessly subjected to the catalyst degrading conditions of the regenerator with the result that its useful catalytic life will be shortened. However, it is possible to retain the less coke deactivated catalyst (second component) within the riser, even to the point where, because of balance between the upward velocity of this catalyst component and its settling rate, it can be made to be remain more or less stationary, within the lower section of the riser defining a zone of concentration therein. To bring about this balance or to otherwise prolong the residency time of the second component of the mixed catalyst system within the riser, the average density, particle size and/or shape of the catalyst particles can be adjusted in a number of ways as to provide the desired settling characteristics. As a general guide, as the average particle size of the catalyst increases and/or its average particle density increases, the residency time of the catalyst will increase.

Assuming, for example, this differential and settling rate is accomplished by making the particles of the second catalyst component initially larger and of greater density than the particles of the first catalyst component and perhaps even more irregular in shape than the latter, gradual attrition of the larger particles (through particle collision) will progressively reduce their capability for prolonged residency in the riser and as time goes on, increasing quantities of such particles will enter the stripping zone where, however, they can still be readily separated based on their different densities.

Methods for increasing the density of the catalyst component containing the optional medium pore zeolites as described above, relative to the component containing the large pore zeolite are described in U.S. Pat. No. 4,752,375, which is incorporated by reference herein.

Process Conditions

Generally in catalytic cracking, the feed is contacted with hot regenerated catalyst in the riser, the feed is vaporized, and the mixture of hot vapor and catalyst is then lifted with simultaneous catalytic reaction in the vertical riser.

The benefits of the invention can be realized by a combination of conditions which includes high riser-reactor temperatures and short catalyst/feed contact time of one second or less, preferably less than one second. Under these conditions, decreased coke selectivity and increased yields of olefinic gasoline are realized.

A gas is used as the catalyst lift medium. As a matter of convention, for fluid catalytic cracking catalyst, incipient bed lifting and incipient bubble formation occurs at gas velocities of about 0.01 and 0.1 ft./second, respectively [P. B. Venuto et al, FLUID CATALYTIC CRACKING WITH ZEOLITE CATALYSTS (Dekker, New York and Basel, pages 44 and 45) 1979]. For gas velocities at or higher than the point of incipient bubbling, the solid particles are described as a fluidized dense bed. At very high lift gas velocities, exceeding those resulting in slugging, the terminal velocity of solid catalyst particles is exceeded and the particles are carried along with the gas. Such a regime is called a dilute phase with pneumatic transport of solids. Conventionally, the lift medium-catalyst suspension pass at a velocity in the range of at least 20 up 50 ft./second through the riser including the riser reaction zone of a vertical length of about 150 ft.

In accordance with the invention, the catalyst-lift suspension is accelerated in the riser (and riser reaction zone), by imposing a constriction on the flow of catalyst-lift suspension, by necking down the upper section of the riser. Said reference to necking down the upper section of the riser can be viewed alternatively as expanding or flaring, the cross sectional geometry of the lower section of the riser. At the throat of the necked down riser, pressure drop with increase in velocity of the catalyst suspension occurs to effect a superficial vapor velocity which exceeds 100 ft./second in the upper section of the riser. Accordingly, the bottom of the vertical riser can be viewed as comprising a cylindrical inlet, a convergent cone, a throat and the upper section of the riser 12 which can be cylindrical (and/or divergent cone in configuration) having a smaller diameter than lower section 11. Introduction of the feed in the upper smaller diameter zone 12 into the riser is at a distance (d) from the riser (including riser reaction zone) product-feed outlet. The overall velocity (average velocity) of the catalyst suspension-feed mixture from riser inlet to said outlet is (v). In accordance with the invention the constriction imposed on the catalyst-lift medium suspension at the throat of the convergent cone is to achieve a velocity (v) wherein (d)/(v) is less than one (1), when more specifically, in accordance with the invention, the velocity of the catalyst suspension-feed mixture exceeds 50 ft./second, and preferably exceeds 100 ft./second and (d) is expressed in feet.

To maintain high temperatures, the lift medium will be light hydrocarbon gas and/or hydrogen, free of steam. The light hydrocarbon gas can be a $C_1-C_5$ hydrocarbon saturated or unsaturated, including a mixture of $C_1-C_5$ hydrocarbon. The lift gas can be $C_3-C_4$, a gas rich in ethylene and/or propylene or in methane. These components of the lift gas will themselves react, e.g., to produce more valuable olefinic light gas and higher molecular weight aromatic products.

By decreasing the diameter of the riser at 10–12 by necking down the riser in the lower section 11 thereof, the lift medium 13 introduced at for example 20 ft./second can be accelerated to 100 ft./second, or greater, through the upper section of the riser. Then the gas oil feed can be introduced. Thus, the contact time of catalyst to feed (15) can be greatly reduced, to less than one second. The riser component of the fluidized cracking units is of preferred type, i.e., its cross-sectional geometry has been modified in the lower section thereof so as to alter the linear velocity of the fluid stream through the riser. The purpose of this feature is to increase the rate of ascent of the catalyst particles, at the throat of the flare through the upper section of the riser 12. The gasiform products of all of the conversion reactions occurring in riser 10 are ultimately discharged from the top of the riser into one or more cyclonic separation zone adjacent the riser discharge as represented by cyclone separator 14 provided with dipleg 20.

Referring to FIG. 1, there is shown a riser reactor 10 lift gas of $C_3$ and $C_4$ paraffins introduced into lower region 11 through conduit 13. The feed combines with regenerated catalyst transferred directly to the bottom of riser 10 through conduit 60 provided with flow control valve 61. The conversion conditions within lower section 11 of riser 10 can be varied depending upon whether it is desired to maximize production of olefins and hydrogen or less aromatics and hydrogen but higher light olefins (for a higher overall liquid yield). When it is desired to emphasize the production of olefins, the ZSM-5 zeolite of the second catalyst component can represent from about 0.01 to about 40, and preferably from about 1 to about 10, weight percent of the total catalyst mixture in this section and the temperature can range from about 1100 to about 1500° F. and preferably from about 1250 to about 1350° F., the catalyst to feed ratio can range from about 50:1 to about 200:1 and preferably from about 100:1 to about 150:1.

A heavy hydrocarbon feed, e g., a gas oil and/or resid, is introduced further up riser 10 in section 12 following the necked down section thereof through conduit 15 and combines with the ascending catalyst-hydrocarbon vapor suspension from lower section 11. Zeolite Y concentration can range from about 2 to about 50, preferably from about 5 to about 40, weight percent, the temperature can range from about 900 to about 1150° F. and preferably from about 925 to about 1000° F., the catalyst to heavy hydrocarbon feed ratio can range from about 3:1 to about 20:1 and preferably from about 4:1 to about 10.1 and the catalyst contact time can range from about 0.5 to about 30 seconds and preferably is less than about 1 second. During passage of the suspension through the upper section of the riser, conversion of the heavy hydrocarbon feed to lower and higher boiling products occurs. The catalyst-hydrocarbon suspension ultimately passes to cyclone separator 14 which separates catalyst particles from gases, the former entering catalyst bed 22 via dipleg 20 and the latter entering chamber 16 for transfer through conduit 18 to a downstream product separation facility (not shown). A source of stripping gas, e.g., steam, is supplied through conduit 27 in the lower section thereof. Stripped, spent zeolite continues its downward flow movement and is withdrawn from the stripper through conduit 36 where it is conveyed to the regenerating zone as represented by regenerator unit 46.

Spent zeolite Y particles attain a relatively high level of hydrocarbonaceous material which is subsequently removed therefrom by regeneration with oxygen-containing regeneration gases. The stripped catalyst particles are passed by conduit 36 provided with flow control valve 38 to catalyst regeneration unit 6 containing a dense fluid bed of catalyst. Regeneration gas such as air is introduced to the lower portion of regenerator 46 by air distributor 150 supplied by conduit 52. Cyclone separators 154 provided with diplegs 56 separates entrained catalyst particles from flue gases and return the separated catalyst to the fluid bed of catalyst Flue gases pass from the cyclones into a plenum chamber and are removed therefrom by conduit 58. Hot regenerated zeolite Y catalyst is returned to the bottom of riser 10 by conduit 60 with flow control value 61 as discussed above to participate in another cycle of conversion.

It is advantageous to utilize hydrogen recovered from the foregoing cracking operation in the hydrotreating of the gas oil/resid charge stock, especially where the latter contains fairly high quantities of metal contaminants and/or sulfur-containing material. Thus, hydrogen recovered from a gas plant operation is conveyed to a hydrotreating unit supplied with a gas oil/resid feed and operated in accordance with conventional or otherwise known conditions in the presence of suitable hydrotreating catalysts, e.g., cobalt and molybdenum oxides on alumina, nickel oxide, nickel thiomolybdate, tungsten and nickel sulfides and vanadium oxide. Process variables include a temperature of from about 600 to about 800° F., a pressure of from about 100 to about 3,000 psig, about 2,000 scf/bbl hydrogen and a space velocity (LHSV) of from about 0.5 to about 8.0. The hydrotreated gas/oil resid at elevated temperature is conveyed through conduit 13 to riser 10 as previously described.

What is claimed is:

1. In a fluid catalytic cracking process undertaken in a vertical riser which includes a feed inlet, a catalytic inlet, and product outlet, the improvement comprising increasing olefin products at the expense of coke production by introducing a cracking catalyst at the catalyst inlet, said cracking catalyst comprising at least one component selected from the group consisting of an amorphous porous silica-alumina and crystalline porous silicate exhibiting an X-ray diffraction pattern of a large pore zeolite;

introducing a lift medium at said catalyst inlet to effect a catalyst suspension with an initial vertical velocity ranging from 20 ft./second to 50 ft./second wherein said lift medium is selected from the groups consisting of $C_1$-$C_5$ paraffins, olefins hydrogen, and admixtures thereof;

passing the catalyst suspension through the riser;

creating a pressure drop within the riser downstream of said catalyst inlet to accelerate a feed to a second velocity up through the riser which exceeds said initial vertical;

passing said feed, which is a hydrocarbon petroleum fraction having an initial boiling point of at least 400° F. a 50% of said feed having a boiling point of at least 500° F. and said feed having end point of at least 600° F., at said second velocity through the riser whereby said feed is contacted with said catalyst for less than one second at a temperature of at least about 1100° F., and product gasoline is separated from said catalyst suspension within one second of said contact.

2. The process of claim 1, wherein said second velocity exceeds 50 ft./second.

3. The process of claim 1 wherein said second velocity exceeds about 100 ft./second.

4. The process of claim 1, wherein said feed is a gas oil or a resid.

5. The process of claim 3 wherein said feed is a gas oil or a resid.

6. The process of claim 1, wherein the said feed inlet is a distance (d) in feet from said product outlet; wherein a value of d/catalyst velocity is less than 1.

7. The process of claim 1, wherein said at least one component exhibits the X-ray diffraction pattern of zeolite Y.

8. The process of claim 1 wherein said catalyst is selected from the group consisting of zeolite X, Y, REY, USY, RE-USY and zeolite beta.

9. The process of claim 1 wherein said cracking catalyst further includes ZSM-5.

10. The process of claim 8, wherein said cracking catalyst further includes ZSM-5.

11. The process of claim 1 wherein said riser includes an upper section and a lower section wherein the pressure drop is effected between said upper section and said lower section.

12. A fluid catalytic cracking process undertaken in a vertical riser which includes a feed inlet, a catalyst inlet, and a product outlet wherein said vertical riser includes an upper section and a lower section and a throat wherein a diameter of the lower section is greater than the diameter of the upper section contiguous to said throat, said throat being between and in communication with said upper section and said lower section wherein said process comprises introducing a cracking catalyst at the catalyst inlet, said cracking catalyst comprising at least one component selected from the group consisting of an amorphous porous silica-alumina or crystalline porous silicate exhibiting an X-ray diffraction pattern of a large pore zeolite;

introducing a lift medium at said catalyst inlet to effect a catalyst suspension with an initial vertical velocity ranging from 20 ft./second to 50 ft./second wherein said lift medium is selected from the group consisting of $C_1$-$C_5$ hydrocarbons, hydrogen, and admixtures thereof;

passing the catalyst suspension through the riser;

creating a pressure drop in the upper section of the riser to effect a feed velocity up through the riser which exceeds said initial vertical velocity, introducing a hydrocarbon petroleum fraction having an initial boiling point of at least 400° F., a 50% of said feed having a boil point of at least 500° F. and an end point range of at least 600° F.; while contacting said feed with said catalyst for less than one second at a temperature of at least about 1100° F.; and separating olefinic gasoline from said catalyst suspension within one second of said contacting.

13. The process of claim 12, wherein said feed velocity exceeds 50 ft./second in said upper section of the riser.

14. The process of claim 12, wherein said feed velocity exceeds about 100 ft./second in said upper section of the riser.

15. The process of claim 12, wherein said feed is a gas oil or a resid.

16. The process of claim 14, wherein said feed is a gas oil or a resid.

17. The process of claim 1, wherein the said feed inlet is a distance (d) in feet from said product outlet; wherein a numerical value of d/feed velocity is less than 1.

18. The process of claim 12, wherein said at least one component exhibits the X-ray diffraction pattern of zeolite Y.

19. The process of claim 12, wherein said catalyst is selected from the group consisting of zeolite X, Y, REY, USY, RE-USY and zeolite beta.

20. The process of claim 12, wherein said cracking catalyst further includes ZSM-5.

21. The process of claim 19, wherein said cracking catalyst further includes ZSM-5.

22. The process of claim 12, wherein said riser includes an upper section and a lower section, wherein the pressure drop is effected between said upper section and said lower section.

* * * * *